US 8,036,119 B2

(12) United States Patent  (10) Patent No.: US 8,036,119 B2
McEwen  (45) Date of Patent: *Oct. 11, 2011

(54) SYSTEM AND METHOD OF PROVIDING BANDWIDTH ON DEMAND

(76) Inventor: Kathy McEwen, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/632,786

(22) Filed: Dec. 7, 2009

(65) Prior Publication Data

US 2010/0183026 A1  Jul. 22, 2010

Related U.S. Application Data

(63) Continuation of application No. 11/743,470, filed on May 2, 2007, now Pat. No. 7,639,612.

(60) Provisional application No. 60/796,660, filed on May 2, 2006.

(51) Int. Cl.
*G01R 31/08* (2006.01)

(52) U.S. Cl. .................... 370/231; 370/395.21

(58) Field of Classification Search .................. None
See application file for complete search history.

(56) References Cited

U.S. PATENT DOCUMENTS

| | | | |
|---|---|---|---|
| 5,457,681 A | 10/1995 | Gaddis et al. | |
| 5,781,623 A | 7/1998 | Khakzar | |
| 5,835,497 A | 11/1998 | Litzenberger et al. | |
| 5,953,350 A | 9/1999 | Higgins | |
| 6,961,539 B2 | 11/2005 | Schweinhart et al. | |
| 7,573,819 B2 * | 8/2009 | Krzanowski et al. | 370/235 |
| 2001/0019559 A1 * | 9/2001 | Handler et al. | 370/468 |
| 2001/0056578 A1 | 12/2001 | Hwang et al. | |
| 2002/0018477 A1 * | 2/2002 | Katz | 370/401 |
| 2002/0150094 A1 | 10/2002 | Cheng et al. | |
| 2002/0172222 A1 * | 11/2002 | Ullmann et al. | 370/468 |
| 2002/0191539 A1 | 12/2002 | Rawlins et al. | |
| 2003/0133552 A1 | 7/2003 | Pillai et al. | |
| 2004/0151153 A1 | 8/2004 | Henry et al. | |
| 2005/0276218 A1 | 12/2005 | Ooghe et al. | |
| 2006/0179154 A1 * | 8/2006 | Sitaraman et al. | 709/231 |
| 2006/0187831 A1 | 8/2006 | Justen | |
| 2007/0002897 A1 | 1/2007 | Goshen et al. | |
| 2007/0214265 A1 * | 9/2007 | Zampiello et al. | 709/226 |

OTHER PUBLICATIONS

Information Sciences Institute, "Internet Protocol Darpa Internet Program Protocol Specification," prepared for Defense Advanced Research Projects Agency Information Processing Techniques Office, Sep. 1981, pp. 1-49.

(Continued)

*Primary Examiner* — Marsha D Banks Harold
*Assistant Examiner* — Hooman Houshmand
(74) *Attorney, Agent, or Firm* — Howison & Arnott, L.L.P.

(57) ABSTRACT

An improved system and method of providing bandwidth on demand for an end user and/or enterprise is disclosed. In one example, the method includes receiving, by a controller positioned in a network, a request for a high quality of service connection supporting any one of a plurality of one-way and two-way traffic types between an originating end-point and a terminating end-point. The controller determines whether the originating end-point is authorized to use the requested amount of bandwidth or the codec and whether the terminating end-point can be reached by the controller. The controller directs a portal that is positioned in the network and physically separate from the controller to allocate local port resources and negotiates to reserve far-end resources for the terminating end-point. The controller also provides routing instructions to the portal.

16 Claims, 11 Drawing Sheets

OTHER PUBLICATIONS

D. Awduche, J. Malcolm, M. O'Dell, J. McManus, UUNET (MCI Worldcom), "Network Working Group Request for Comments: 2702 Category: Information, "Requirements for Traffic Engineering Over MPLS", Sep. 1999", pp. 1-28.

S. Yasukawa, Ed., NTT, Network Working Group Request for Comments: 4461 Category: Informational, "Signaling Requirements for Point-to-Multipoint Traffic-Engineered MPLS Label Switched Paths (LSPs)", Apr. 2006, pp. 1-29.

D. Awduche, Movaz Networks, Inc., L. Berger, D. Gan, Juniper Networks, Inc., T. Li Procket Networks, Inc., V. Srinivasan, Cosine Communications, Inc., G. Swallow, Cisco Systems, Inc., Network Working Group Requst for Comments: 3209 Category: Standards Track, "RSVP-TE: Extensions to RSVP for LSP Tunnels," Dec. 2001, pp. 1-57.

* cited by examiner

SYSTEM AND METHOD OF PROVIDING BANDWIDTH ON DEMAND

CROSS-REFERENCE TO RELATED APPLICATIONS

This application is a continuation application of U.S. patent application Ser. No. 11/743,470, filed May 2, 2007, and entitled SYSTEM AND METHOD OF PROVIDING BANDWIDTH ON DEMAND, which application claims priority to and benefit of U.S. Provisional Application Ser. No. 60/796,660, filed May 2, 2006, and entitled IMPROVED SYSTEM AND METHOD OF PROVIDING BANDWIDTH ON DEMAND, both by inventor Kathy McEwen, the specifications of which are incorporated herein in their entireties.

BACKGROUND

The present invention generally relates to communications systems, and specifically to an improved system and method of providing guaranteed bandwidth on demand for an end user and/or enterprise.

Internet protocol (IP) networks were designed to handle any traffic, on any port, at any time. The goal was to utilize as many computing platforms as were available across a consortium of universities, governments and industries willing to share information (Reference IETF RFC 791 Internet Protocol Darpa Internet Program Protocol Specification, September 1981).

Figure 1:
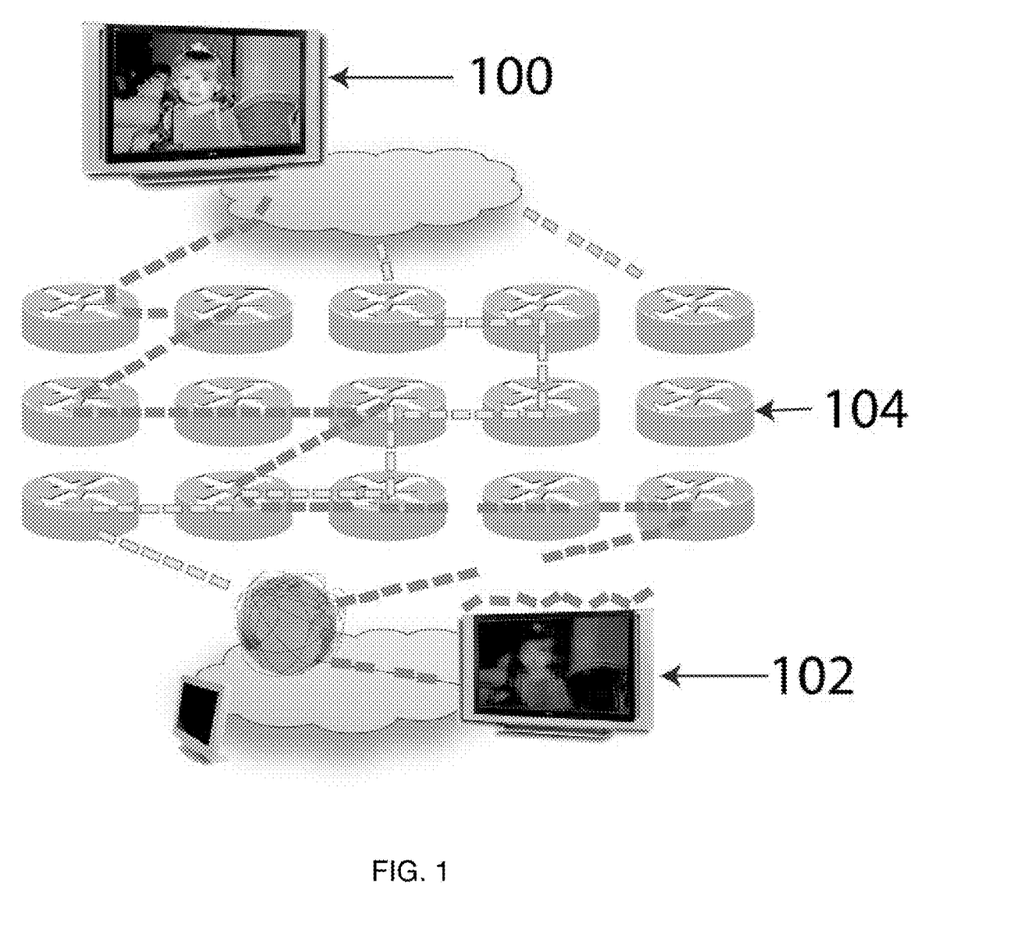
FIG. 1 is a diagram representing IP Routing In-efficiencies.

With these goals in mind, each of the computing platforms, or routers, were originally designed to be ad-hoc in nature. That is, they broadcast on each of their ports, the routing and cost to send a packet to itself. Each manufacturer of these routers defined their own concept of cost and its associated value. As a result of IP's original design goals, the path that a packet takes from origin to destination is completely unpredictable. In the example in FIG. 1, a user is attempting to send IP video packets streaming from a source 100 to a destination 102, but the originator can not predict nor control how those packets will be transported across an IP network 104, nor can the originator even assume that all the packets streamed through the network 104 will take the same path to reach the destination 102. An IP router can not plan how a packet (or stream of packets) will reach its destination, nor can routers plan how many other routers will transmit the packet. It takes, on average, anywhere from 10 to 20 or more routers to send a packet across the internet today.

Figure 2:
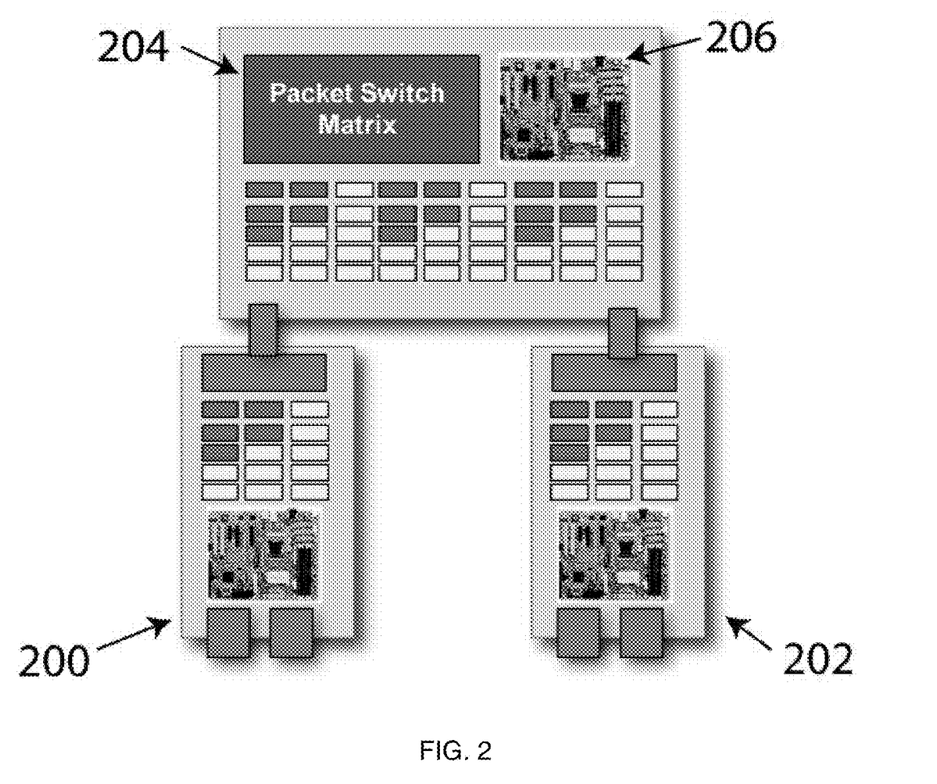
FIG. 2 is a diagram of a typical IP Router Architecture.

Now referring to FIG. 2, every router stops each incoming packet to determine whether it is allowed, its class of service, how to route it, and then, because they are processing so many unpredictable packet sizes/rates, they must queue the packets at both the ingress 200 and egress 202 ports, and possibly even at the internal switching matrix 204. A typical IP router architecture includes packet switching matrices 204, intelligent routing processors 206, and large memory queues at the ingress 200 (incoming) and egress 202 (outgoing) ports, as well as at a centralized interconnect level to move packets from one ingress port card to a different egress port card. With so much queuing and processing on each packet, packets may be lost or delayed beyond video services quality tolerance.

Figure 3:
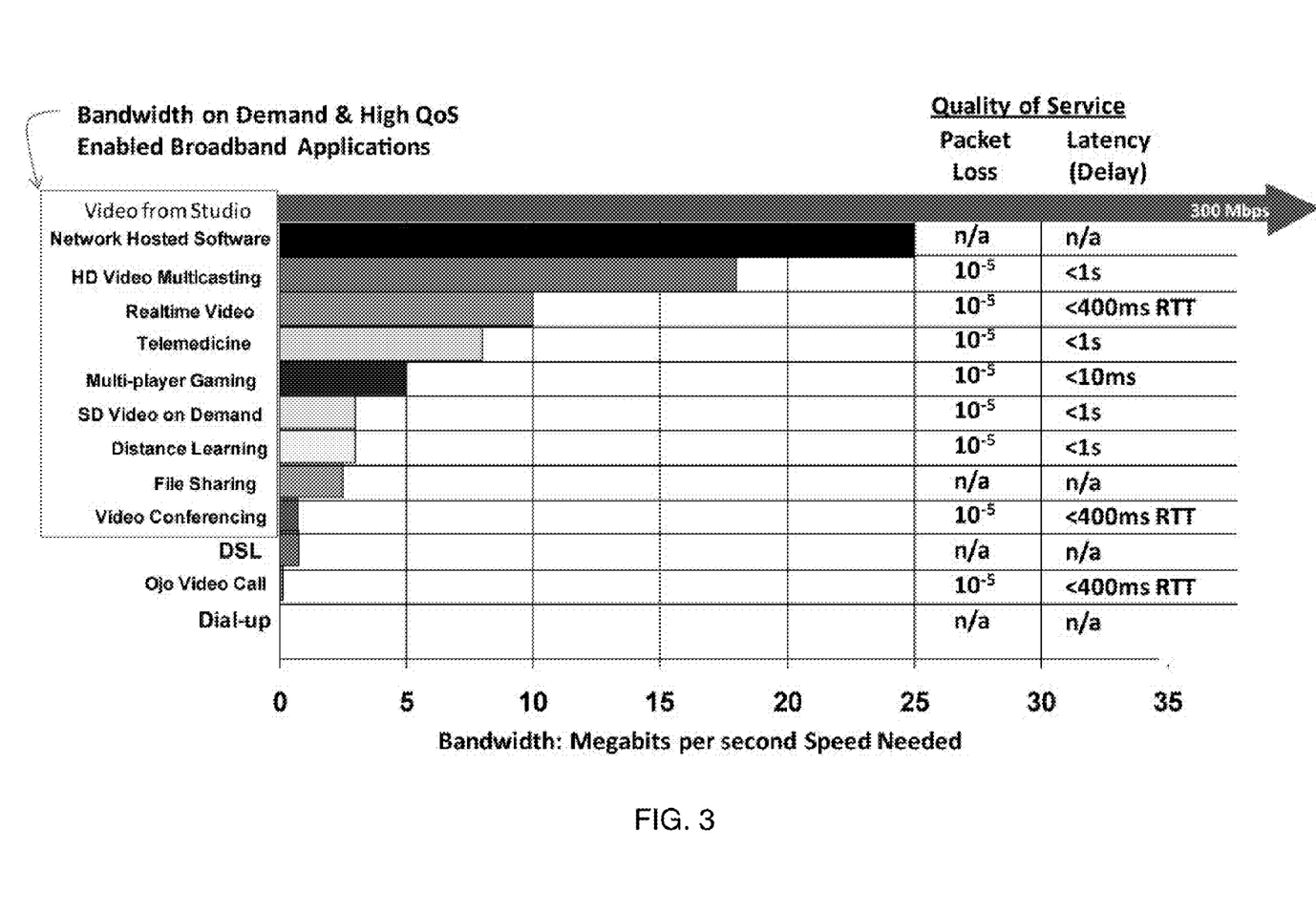
FIG. 3 is a diagram of Sample Broadband Applications Quality Requirements.

The services that may be delivered on broadband are many, ranging from real-time critical applications for communication purposes: video calling, multi-player gaming, telemedicine, television studio broadcast interviews, and high-definition news multicasting to name a few. These examples and a few others are listed in FIG. 3. These real time critical applications are very sensitive to any delay and for any that may include video or gaming frames, very sensitive to any variance in the delay. Applications which include video are also sensitive to any packets (or frames) which may be lost in the transmission (0.0001% packet loss is the preferred quality for video transmission).

Multi-Protocol Label Switching (MPLS) was developed to overcome some of the traffic engineering constraints of the IP protocols. MPLS allows operators to engineer a core network that aggregates traffic from IP, ATM, Frame Relay or even time-division voice domains, across a common packet core network. MPLS network operators can pre-define label switch paths, and ensure that virtual private network traffic is delivered on specific routes to achieve guaranteed quality of service levels (See IETF RFC 2702, Requirements for Traffic Engineering over MPLS).

Figure 4:
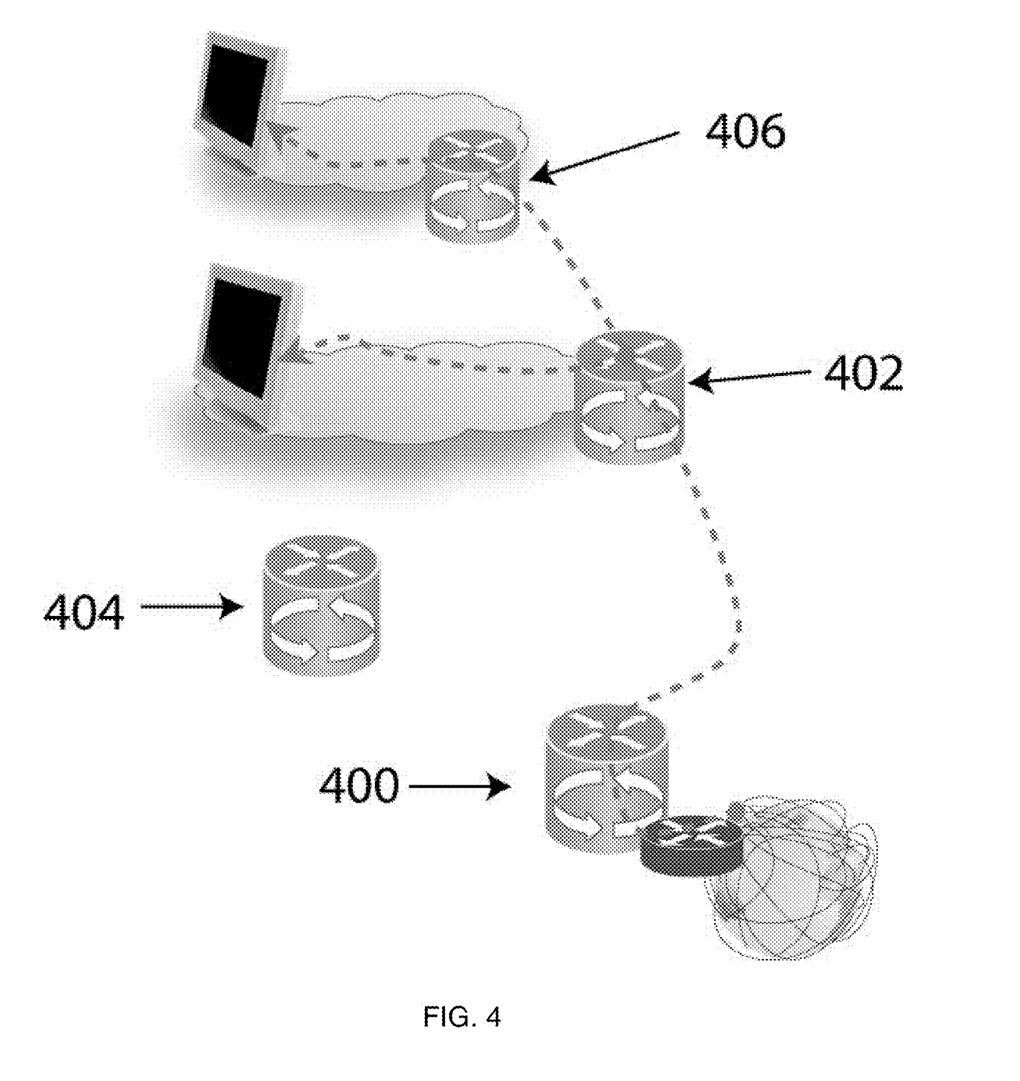
FIG. 4 is a diagram of MPLS Traffic Engineering and Point to Multipoint Multi casting.

MPLS standards have expanded to include point-to-multipoint multicasting (Reference IETF 4461: Signaling Requirements for Point-to-Multipoint Traffic-Engineered MPLS Label Switched Paths (LSPs)), and resource reservation protocols (Reference IETF RFC 3209, RSVP-TE: Extensions to RSVP for LSP Tunnels and RFC 4420) that dynamically utilize bandwidth across the core thus enabling less expensive transport for video broadcast traffic. The multicasting protocol enables construction of a distribution tree that replicates packets only at the branch points, rather than from the origination point. Now referring to FIG. 4, a stream of packets can begin at a single source point in the IP domain, and traverse across an MPLS packet network starting at a point 400, following a controlled path to a specific router at point 402, bypassing any un-necessary MPLS routers like point 404. The Originating MPLS Router can utilize the point-to-multipoint multicasting capabilities of MPLS, to instruct MPLS Router 402 to multicast the traffic to another user connected to MPLS Router 406. MPLS also expanded to include a Fast-Reroute method, which allows for a 50 millisecond route recovery in the event of a link failure, comparable to that of optical SONET networks. These attributes make MPLS the technology of choice for core network video transport today.

However, MPLS does not readily extend to the customer premises locations, as its focus has been on core packet transport aggregation, enabling controlled routing and quality of assurance through the packet transport. Also, MPLS was developed around the concept of delivering enterprise virtual private networking; thus much of the protocols and methods of packet quality assurance in MPLS require the utilization of a virtual Local Area Network (LAN).

Although IP Multimedia Subsystem (IMS) standard protocols evolved to try to address handling real-time multimedia streams across the IP packet domain, these standards have largely focused on enabling the streaming services as an overlay solution across existing IP network domains, without addressing any changes to the IP or MPLS routing architectures. Quality assurance requires managing the services end to end, from customer access point to access point. In addition, IMS standards were intended to be access agnostic, so the customer premises access point standards have been separately handled by various wireless (CDMA, GSM, UMTS, WiFi, WiMax, etc.) and wireline (Cable, DSL and Fiber, etc.) access standards.

Recently, focus for broadband applications has moved away from IMS to an evolution of these protocols within the 3GPP organization called TISPAN (Telecommunications & Internet Converged Services and Protocols for Advanced Networking) TISPAN intends to include methods for handling resource allocation and quality assurance, but again does not address the elements that sit within the customer premises to network access domain, leaving those up to the other standards bodies governing the various access types.

Figure 5:
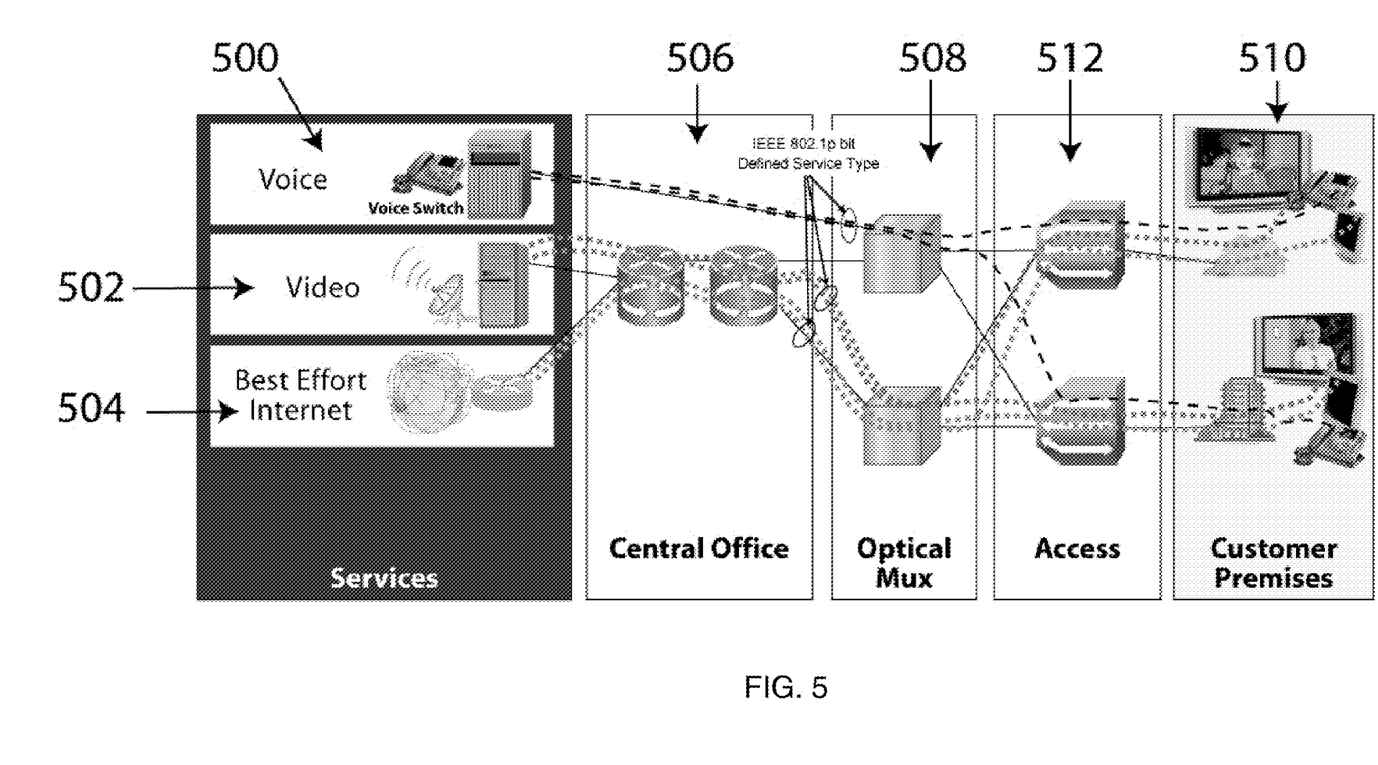
FIG. 5 is a diagram of a Broadband Access Network.

For the current broadband services deployments taking place, broadband network operators are utilizing mechanisms like the IEEE 802.1p bit marking to differentiate the service classes, and route traffic accordingly. Now referring to FIG. 5, the current services, comprising legacy public switched voice 500, video 502 and best-effort internet 504 access are served by existing network components, interconnected to the access networks via ATM, IP or IP/MPLS routers 506 and/or optical multiplexing solutions 508. Consumers and/or enterprises 510 connect via an access network 512, broadband or narrowband, to the services domain through access network equipment such as DSL Access Multiplexors (DSLAMs), Fiber Optic Access (such as Optical Line Terminals-OLTs) and various other access technologies. Services are delivered with assurance by interconnecting to the consumers via the broadband access network utilizing technologies such as IEEE 802.1 p bit defined service types. There are 8 p bits to differentiate service type—thus only 8 service classes. This is insufficient to cover a multitude of service offerings that may all require high quality broadband connections.

Figure 6:
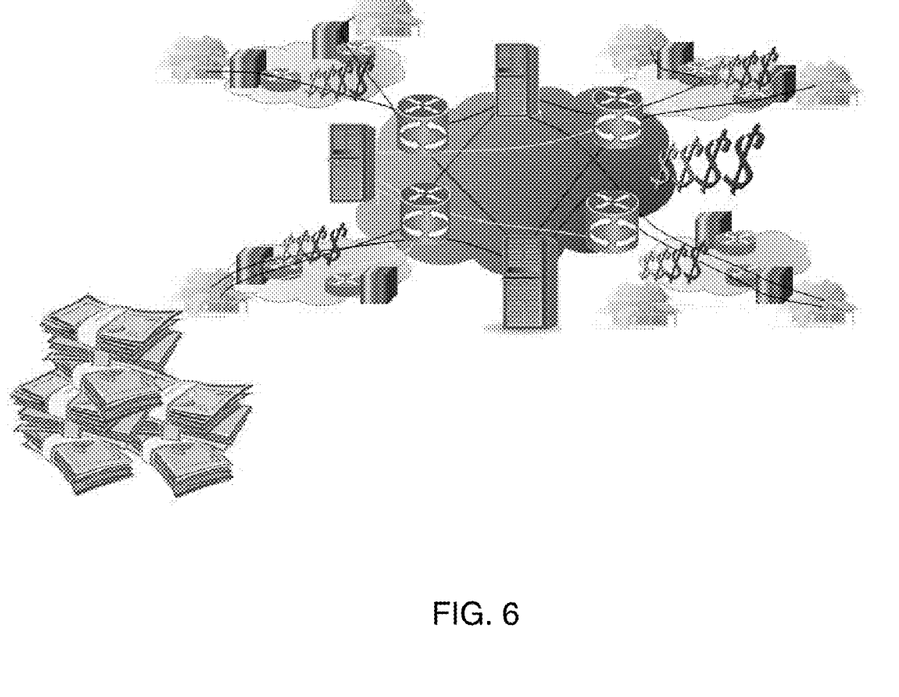
FIG. 6 is a diagram of Multiple Services Offered with Quality across Broadband Network Domains.

Today, the only quality video transport with assurance that operators can use are dedicated line, virtual private networking services. Each new service that requires a high quality packet transport requires a separate virtual private network. This does not allow for dynamic bandwidth allocation and utilization—thus it does not economically scale across multiple services or across multiple users. An example of is illustrated in FIG. 6.

Video transmission requires compression in order to effectively utilize the available broadband bandwidth across packet domains. Currently there are numerous different methods for encoding the video, some standardized and some are proprietary. Many existing video communication solutions today utilize proprietary mechanisms, which are incompatible across multi-vendor and access domains. Additionally, the video compression methods vary greatly in the bandwidth they require to transport the video in real-time—some solutions are as low as 64 kbps up to 300 Mbps. The bandwidth required can vary based on the codec type and the quality type compressed within the codec type. For example, MPEG-4 (Motion Picture Experts Group-4) defines methods to combine and encode video with sound and text, including the encoding of Standard Definition and High Definition.

Therefore, what is needed is an improved method and system of delivering guaranteed high bandwidth applications to an end user and/or enterprise end to end.

SUMMARY

In one embodiment, the present disclosure provides a method for providing bandwidth on demand. The method comprises receiving, by a controller positioned in a network, a request for a high quality of service connection supporting any one of a plurality of one-way and two-way traffic types between an originating end-point and a terminating end-point, wherein the request comes from the originating end-point and includes at least one of a requested amount of bandwidth and a codec; determining, by the controller, whether the originating end-point is authorized to use the requested amount of bandwidth or the codec and whether the terminating end-point can be reached by the controller; directing, by the controller, a portal that is positioned in the network and physically separate from the controller to allocate local port resources of the portal for the connection; negotiating, by the controller, to reserve far-end resources for the terminating end-point; and providing, by the controller to the portal, routing instructions for traffic corresponding to the connection so that the traffic is directed by the portal based only on the routing instructions provided by the controller, wherein the portal does not perform any independent routing on the traffic, and wherein the connection extending from the originating end-point to the terminating end-point is provided by a dedicated bearer path that includes a required route supported by the portal and dynamically provisioned by the controller, and wherein control paths for the connection are supported only between each of the originating and terminating end-points and the controller and between the portal and the controller.

BRIEF DESCRIPTION OF THE DRAWINGS

For a more complete understanding, reference is now made to the following description taken in conjunction with the accompanying Drawings in which.

DETAILED DESCRIPTION

The present disclosure can be described by the embodiments given below. It is understood, however, that the embodiments below are not necessarily limitations to the present disclosure, but are used to describe a typical implementation of the invention.

The present invention provides an improved unique system and method of providing bandwidth on demand for an end user and/or enterprise. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

The invention involves taking a distributed approach to handling bearer packets, with a physically separated controller and managed portal platform. The Controller handles signaling, routing, dynamic bandwidth admission control, codec (video and/or voice) negotiation, end-to-end quality assurance, session management, subscriber data, billing, provisioning and associated operational functions. The Portal handles the packet bearer transport with the admission control and routing instructions given by the separate physical Controller. The invention fits at the access and/or in the core network. Connections can be made between consumers, enterprises and/or content providers. For example, consumer to business, business to consumer, consumer to consumer, business to business, consumer to content provider, business to content provider, content provider to consumer, content provider to business, and content provider to content provider.

Figure 7:
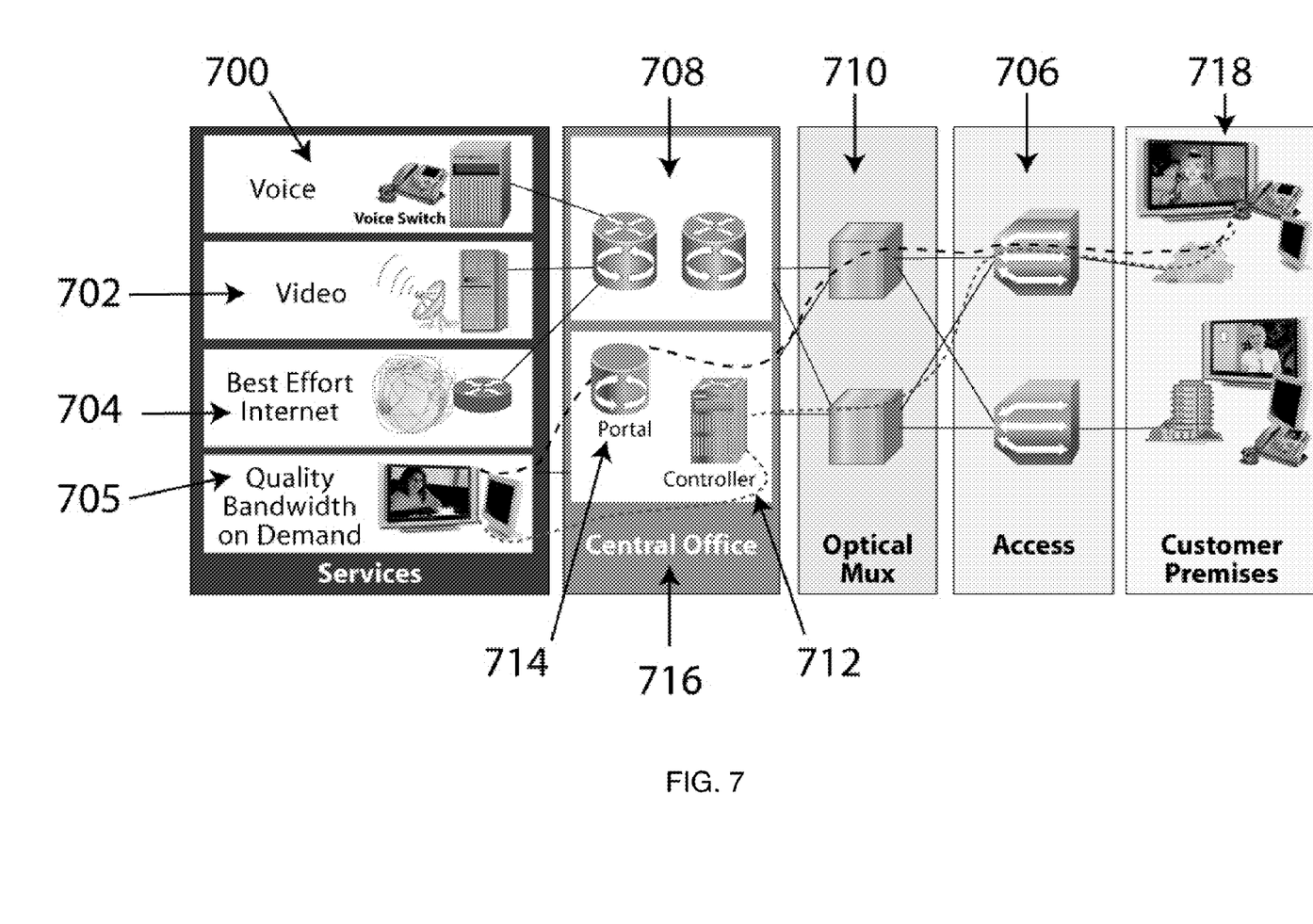
FIG. 7 is a diagram of a Controller and Portal Solution in the Access Network.

Now referring to FIG. 7, the current services, comprising legacy public switched voice 700, video 702 and best-effort internet access 704 will continue to be served by the existing network components, interconnected to the access networks 706 as they are today via ATM, IP or IP/MPLS routers 708 and optical multiplexing solutions 710. The Controller 712 and Portal 714 are introduced at the central office 716, in similar locations as edge IP/MPLS aggregation routers 708. The Controller 712 and Portal 714 delivers high quality bandwidth on demand services 705. For example, video and gaming applications, can interconnect to the consumers 718 via the access network 706.

The Controller 712 accepts requests from an originating end-point to access the network with a high quality connection dynamically. The Controller 712 then negotiates across the network with the terminating end-point(s) to set up the connection, and ensures interoperability of service type (if used) and video codec type, and quality bandwidth reservation end-to-end.

Instead of trying to introduce a new class of service type for each additional high quality service and content provider at the access edge (See FIG. 6), one class of service type is introduced to cover all high quality services (See FIG. 7). Then all traffic requesting this service type is routed to an access Controller 712 and 714 Portal for handling. Alternatively, if the broadband access provider does not want to provision a specific class of service for the Controller and Portal for handling, a consumer may signal directly to the Controller and Portal.

Figure 8:
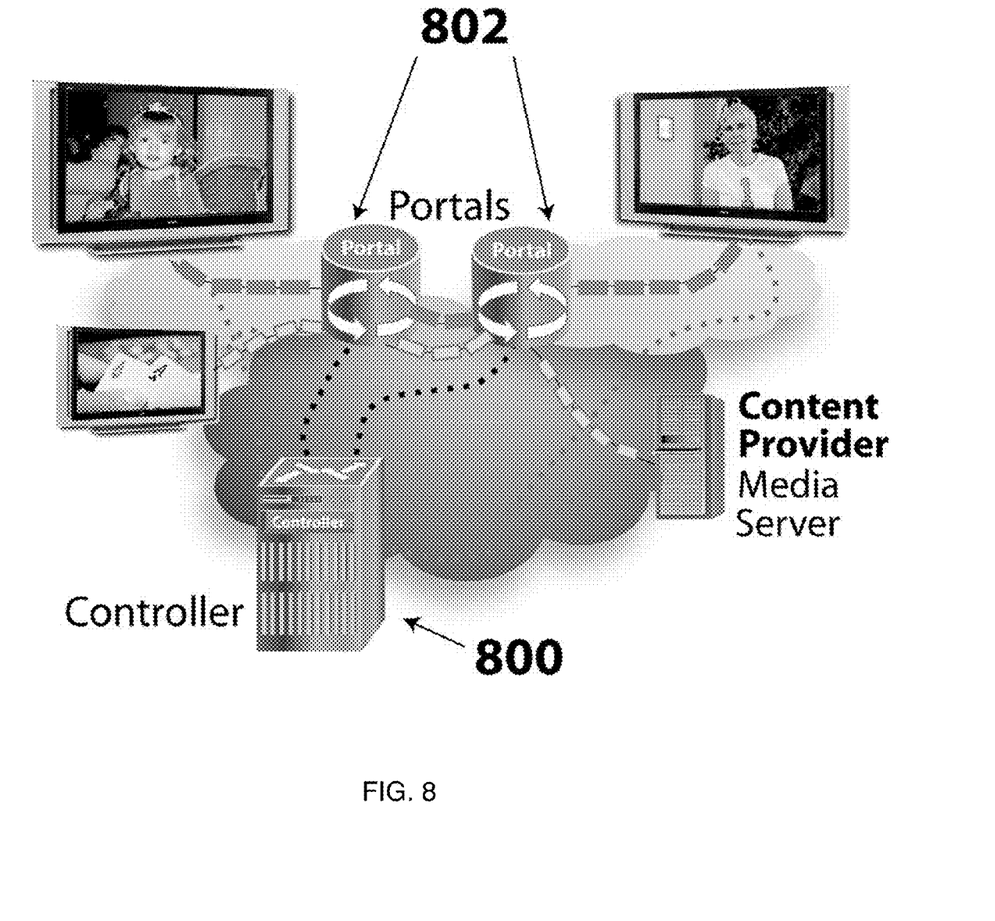
FIG. 8 is a diagram of a Controller and Portal Solution.

Now referring to FIG. 8, when one dynamic video or bandwidth user wants to connect to another, they simply dial a directory number or IP address or web page to request a connection on demand. The Controller 800 will receive the request, including bandwidth required and if video, a video codec type and a service type tag (if applicable) for billing purposes, and determine from its embedded subscriber database whether the user is authorized to use the bandwidth, video type and service or not, how to bill them, and whether the destination party can be reached.

The Controller 800 and Portal 802 are interconnected to each other and to content providers. The Controller 800 and Portal 802 also interconnect consumers, businesses and/or content providers. The control signaling connects using protocols directly to consumers, businesses, and/or content providers. The bearer between consumers, businesses, and/or content providers is connected through the Portal platforms 802.

In order to ensure quality, the Controller 800 inter-works with network protocols to dynamically provision a dedicated path, including required route and bandwidth, on demand through the network. The Controller 800 directs its associated Portal platform 802 to allocate local port resources, and then signals any destination party's Controller to reserve far-end resources.

The Controller 800 enables each bandwidth on demand user, originator and terminator, to negotiate with the network. The negotiation includes information elements necessary to ensure an end-to-end video connection free from video codec conversion in the core if possible. This avoids interoperability issues between user systems, and enables all application end-points to communicate freely.

Figure 9:
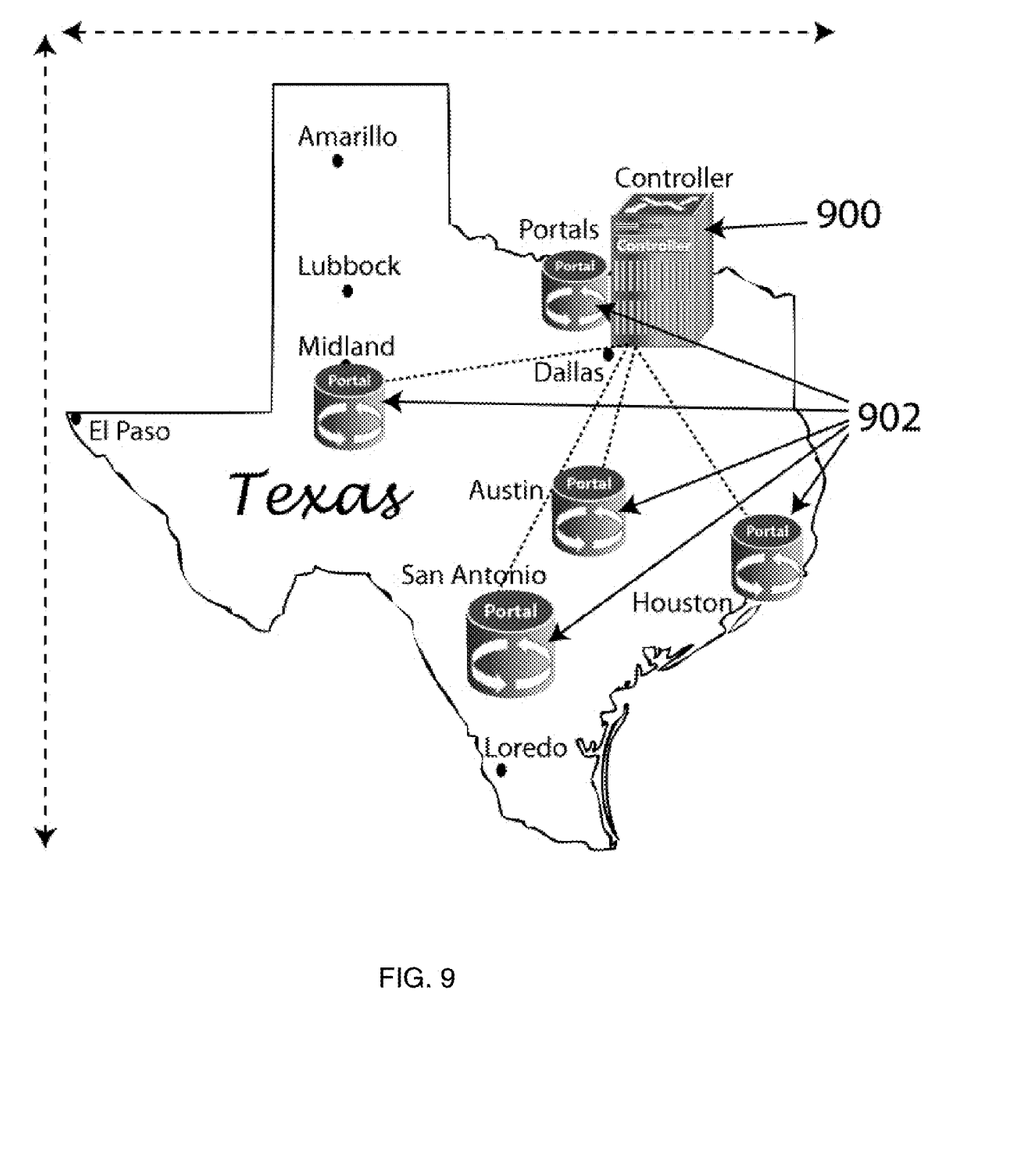
FIG. 9 is a diagram of a Controller and Portal Distributed Deployment.

Now referring to FIG. 9, the Controller 900 and Portals 1102 can be physically located in the same location or in separate locations. The Controller 900 communicates and controls the portals 1102 via a link—the distance from the Controller 900 to the Portals 1102 can be close or very far. This allows network owners to optimize transmission utilization to keep high bandwidth traffic closest to the user, while centralizing routing, maintenance, operations and control functions in a single regional location.

The invention takes distributed switching control concepts from the low-bandwidth voice domain, and extends them to the variable-bandwidth packet routing domain. Moreover, the Portal 902 is under the direct management of the Controller 900. It only accepts traffic on its ports when authorized by the Controller 900 in real-time, and notifies the Controller 900 if a user's traffic terminates or exceeds allowance. The Portal 902 does not perform new routing on any packet, and only acts on the information provided by the controller 900. If any packets are received on any port at the Portal 902, which are arriving from a user that has not been authorized to use it, then those packets are discarded without prejudice. If an authorized user should exceed the limit authorized, the Controller 900 is informed, and an alarm is raised. The Controller 900 determines whether the user who is exceeding their limit should be disconnected, or allowed to continue, and instructs the Portal 902 according to a pre-set time limit. The Controller 900 contains a completely integrated bandwidth/portal admission control, routing and element management solution, which tracks, manages, and bills for all usage (Controller 900 plus its subordinate Portals 902). Furthermore, the maximum limit of Portals 902 to Controller 900 is determined based on the aggregate subscriber usage capacity across all Portals 900.

Figure 10:
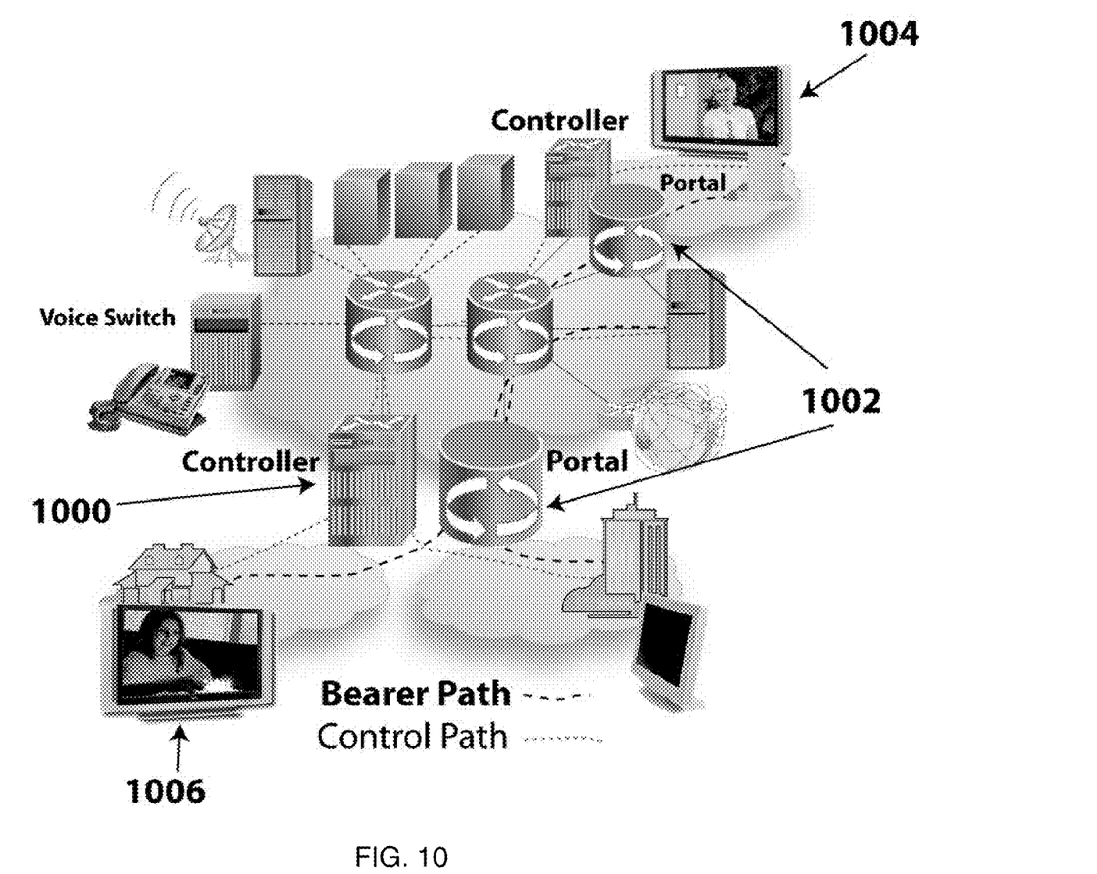
FIG. 10 is a diagram of a Controller and Portal End-to-End Network Solution.

Now referring to FIG. 10, the Controller 1000 and Portals 1002 serve the access networks at the access locations, which are near consumers, businesses, and/or near to content providers. The Controller 1000 and Portal 1002 interconnect to each other and any other platforms, which could be via existing IP/MPLS routers or multiplexing equipment or other transport connection mechanisms. The consumers 1004, 1006 are connected directly to the Controller 1000 and Portal 1002 across the access. Content providers, back-office provisioning, billing and element management systems interconnect to the Controller 1000 and Portals 1002. The best-effort internet is bypassed completely for any high quality broadband connections. In addition, all provisioning, element management and routing is managed at the Controller 1000, and is visible via a remote connection. Furthermore, the Controller supports flexible charging arrangements that can be based on any combination of or single element of service type, time elapsed, codec type and bandwidth used on the network; and this can be billed for either after the session has terminated, or in real-time through a pre-paid billing mechanism which allows for termination of the session at any time based on available credit(s). Originating and terminating party records are issued, or both, including information about route used for transport charging purposes. If users are connecting across regions, states, nations or carriers, the information is recorded for billing purposes.

Figure 11:
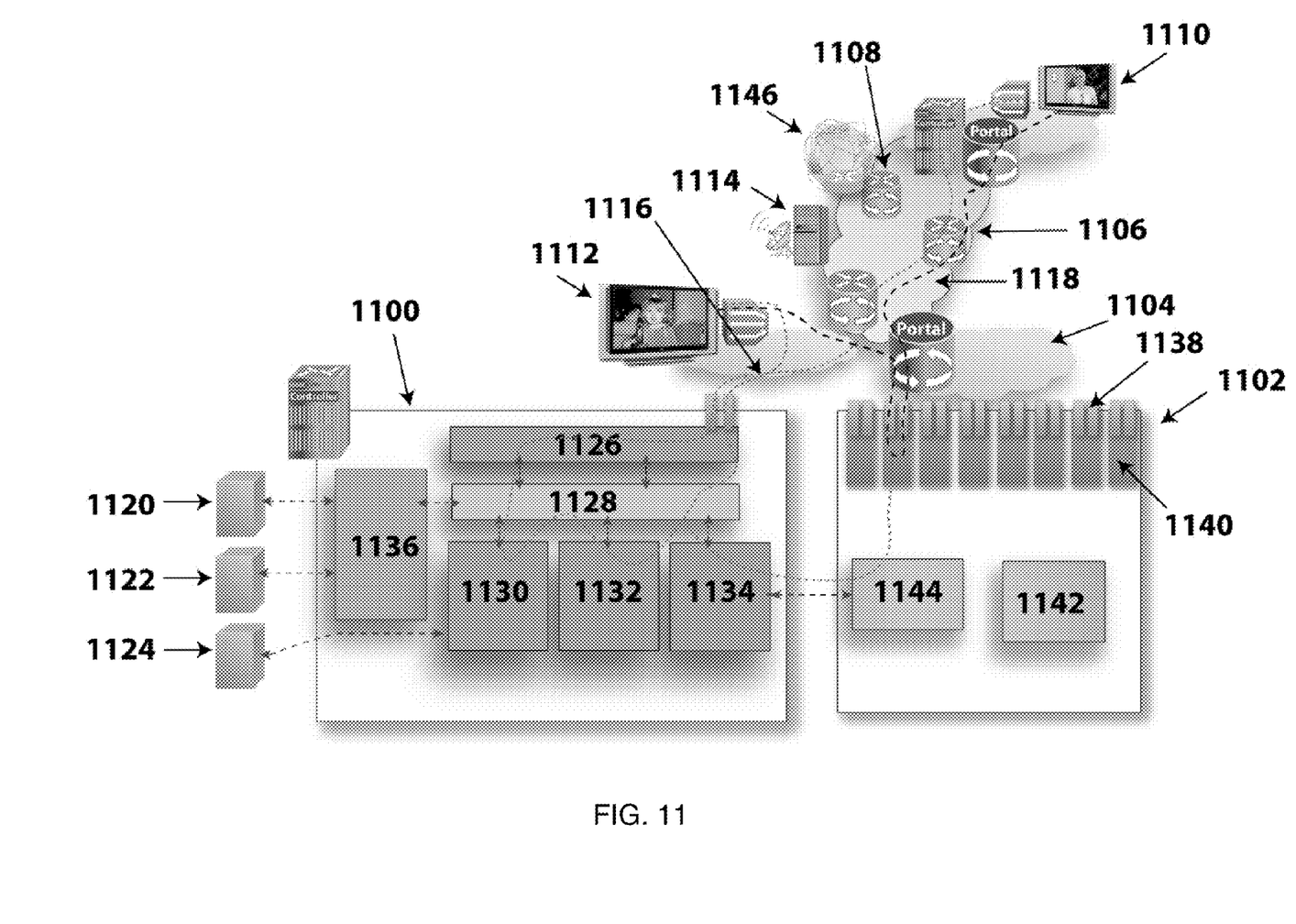
FIG. 11 is a diagram of a Controller and Portal Architectural Solution.

Now referring to FIG. 11, a Controller 1100 and Portal 1102 serve the access networks at the access locations 1104. The Controller 1100 and Portal 1102 interconnect to each other and any other platforms 1106, which could be via existing IP/MPLS routers 1108 and/or multiplexing equipment and/or any other transport mechanisms. In addition, the consumers 1110, businesses 1112 and or content providers 1114 are connected, for control signaling via path 1116 and via path 1118 for bearer path, directly to the Controller 1100 and Portal 1102 across the access domain. The Controller 1100 includes I/O ports 1120, 1122, and 1124 connecting a signaling/security function 1126 to a message distribution function 1128 that handles distributing all control signaling to the subscriber data function 1130, session management function 1132, routing/bandwidth admission and quality assurance management function 1134, and handles all functions including billing/OA&M 1136, necessary for the broadband services to be dynamically connected and managed with quality. The Portal 1102 includes I/O ports 1138 on line cards 1140 for the bearer connections, a switching matrix 1142 and a portal connectivity processing element 1144. The content services 1114 interconnects to the Controller 1100 and Portal 1102. The back-office provisioning, billing and element management systems 1132 interconnect to the Controller 1100 and Portal 1102. The best-effort internet 1146 is bypassed completely for any high quality broadband connections.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing bandwidth on demand comprising:
   receiving, by a controller positioned in a network, a request for a high quality of service connection supporting any one of a plurality of one-way and two-way traffic types between an originating end-point and a terminating end-point, wherein the request comes from the originating end-point and includes at least one of a requested amount of bandwidth and a codec;
   determining, by the controller, whether the originating end-point is authorized to use the requested amount of bandwidth or the codec and whether the terminating end-point can be reached by the controller;
   directing, by the controller, a portal that is positioned in the network and physically separate from the controller to allocate local port resources of the portal for the connection;
   negotiating, by the controller, to reserve far-end resources for the terminating end-point; and
   providing, by the controller to the portal, routing instructions for traffic corresponding to the connection so that the traffic is directed by the portal based only on the routing instructions provided by the controller, wherein the portal does not perform any independent routing on the traffic, and wherein the connection extending from the originating end-point to the terminating end-point is provided by a dedicated bearer path that includes a required route supported by the portal and dynamically provisioned by the controller, and wherein control paths for the connection are supported only between each of the originating and terminating end-points and the controller and between the portal and the controller.

2. The method of claim 1 wherein the controller is associated with a single class of service and wherein a service type of the request identifies the request as being of the single class of service and the request is routed to the controller based on the service type.

3. The method of claim 1 wherein the request is received by the controller based on signaling from a user to the controller.

4. The method of claim 3 wherein the request is received from the user via one of a directory request, an Internet Protocol address, and a web page.

5. The method of claim 1 further comprising:
   identifying, by the controller, billing information of a user corresponding to the request for a high quality of service connection; and
   charging the user for the connection.

6. The method of claim 5 wherein the charging may be based on at least one of a service type, an elapsed period of time, a codec type, and an amount of bandwidth used.

7. The method of claim 1 wherein determining whether the originating end-point is authorized is based on information in a subscriber database.

8. The method of claim 1 wherein the negotiating, by the controller, to reserve far-end resources on the terminating end-point includes negotiating with another controller associated with the terminating end-point.

9. The method of claim 1 wherein the negotiating, by the controller, to reserve far-end resources for the terminating end-point includes negotiating directly with the terminating end-point.

10. The method of claim 1 wherein the negotiating, by the controller, to reserve far-end resources for the terminating end-point includes negotiating a video codec for use with the connection to avoid video codec conversion between the originating and terminating end-points.

11. The method of claim 1 wherein the connection is a point-to-point connection between only the originating and terminating end-points.

12. The method of claim 1 wherein the connection is a point-to-multipoint connection between one of the originating and terminating end-points and the other of the originating and terminating end-points and at least one other end-point.

13. A method for providing bandwidth on demand comprising:
   receiving, by a controller positioned in a network, a request for a high quality of service connection between an originating end-point and a terminating end-point, wherein the request includes at least one of a requested amount of bandwidth and a video codec;
   determining, by the controller, whether the originating end-point is authorized to use the requested amount of bandwidth or the video codec;
   communicating, by the controller, with the originating and terminating end-points to ensure that the connection is free from video codec conversion;
   directing, by the controller, one of a plurality of portals that is positioned in the network nearest to the originating end-point and physically separate from the controller to allocate local port resources of the portal for the connection; and sending, by the controller to the portal, routing instructions for the connection, wherein traffic for the connection is routed by the portal based only on the routing instructions, and wherein the connection extending from the originating end-point to the terminating end-point is provided by a dedicated bearer path that includes a required route supported by the portal and dynamically provisioned by the controller, and wherein control paths for the connection are supported between each of the originating and terminating end-points and the controller and between the portal and the controller.

14. The method of claim 13 further comprising negotiating, by the controller, to reserve far-end resources on the terminating end-point.

15. The method of claim 14 wherein the negotiating is performed with one of another controller associated with the terminating end-point or directly with the terminating end-point.

16. The method of claim 13 further comprising:
receiving, by the controller, a notification from the portal that traffic on the connection has exceeded an authorized limit; and
instructing the portal, by the controller, whether to terminate or allow the connection to continue.

* * * * *